(12) United States Patent
Tanimoto

(10) Patent No.: US 7,929,168 B2
(45) Date of Patent: Apr. 19, 2011

(54) COMMUNICATION APPARATUS

(75) Inventor: Yoshifumi Tanimoto, Kyoto (JP)

(73) Assignee: Murato Kikai Kabushiki Kaisha, Kyoto-shi (JP)

( * ) Notice: Subject to any disclaimer, the term of this patent is extended or adjusted under 35 U.S.C. 154(b) by 965 days.

(21) Appl. No.: 11/819,396

(22) Filed: Jun. 27, 2007

(65) Prior Publication Data

US 2008/0002224 A1    Jan. 3, 2008

(30) Foreign Application Priority Data

Jun. 28, 2006  (JP) .................................. 2006-177834

(51) Int. Cl.
*G06F 3/12*  (2006.01)
(52) U.S. Cl. ....... 358/1.15; 358/400; 358/403; 358/407; 709/228; 709/206; 379/142.05; 379/202.01; 370/352
(58) Field of Classification Search .................. 358/1.15, 358/1.13, 400, 442, 402, 407; 709/206, 219, 709/227; 370/352, 395, 351; 379/142.05, 379/202.01, 110.01
See application file for complete search history.

(56) References Cited

U.S. PATENT DOCUMENTS

| | | | | |
|---|---|---|---|---|
| 6,115,739 | A * | 9/2000 | Ogawa et al. ................. | 709/215 |
| 7,417,760 | B2 * | 8/2008 | Tonami et al. ............... | 358/1.15 |
| 7,653,683 | B2 * | 1/2010 | Armstrong et al. .......... | 709/203 |
| 7,711,614 | B2 * | 5/2010 | Hatano et al. ................. | 705/28 |
| 2004/0021890 | A1 * | 2/2004 | Hirai et al. .................... | 358/1.13 |
| 2004/0151204 | A1 * | 8/2004 | Eguchi et al. ................. | 370/465 |
| 2004/0158733 | A1 * | 8/2004 | Bouchard .................... | 713/200 |
| 2004/0214588 | A1 | 10/2004 | Tanimoto | |
| 2005/0216562 | A1 * | 9/2005 | Armstrong et al. .......... | 709/206 |
| 2005/0216602 | A1 * | 9/2005 | Armstrong et al. .......... | 709/250 |
| 2006/0274358 | A1 * | 12/2006 | Fukui et al. .................. | 358/1.15 |
| 2006/0274367 | A1 * | 12/2006 | Yamamoto et al. .......... | 358/1.15 |
| 2006/0274371 | A1 * | 12/2006 | Sakai ........................... | 358/1.15 |
| 2006/0282466 | A1 * | 12/2006 | Yasukaga et al. ........... | 707/104.1 |
| 2006/0282500 | A1 * | 12/2006 | Kiuchi et al. ................. | 709/203 |

(Continued)

FOREIGN PATENT DOCUMENTS

CN    1540945 A    10/2004

(Continued)

OTHER PUBLICATIONS

Office Action in JP 2006-177834, issued Apr. 4, 2008.

(Continued)

*Primary Examiner* — Negussie Worku
(74) *Attorney, Agent, or Firm* — Westerman, Hattori, Daniels & Adrian, LLP

(57) ABSTRACT

A communication apparatus allows an efficient transmission/reception of a document for a sender and a receiver at their respective desired time and location. When a first user transmits a document using a facsimile machine (transmitting device) managed by a server, first, an account of the transmitting device is registered on the server. In such a state, when the first user inputs an account of a second user as a destination into the transmitting device, the transmitting device inquires the server of a registration status of the second user. The server checks the registration status of the account of the second user. When the account of the second user is registered on any facsimile machine (receiving device), the server notifies the transmitting device that the account of the second user is registered on the receiving device. Then, the transmitting device transmits a connection demand to the receiving device to transmit data of the document.

6 Claims, 10 Drawing Sheets

U.S. PATENT DOCUMENTS

2007/0255632 A1 * 11/2007 Hatano et al. .................. 705/28

FOREIGN PATENT DOCUMENTS

| JP | 06-121046 A | 4/1994 |
| --- | --- | --- |
| JP | 06-326775 A | 11/1994 |
| JP | 07-143315 A | 6/1995 |
| JP | 09-107457 A | 4/1997 |
| JP | 2003-319073 A | 11/2003 |
| JP | 2004-172853 A | 6/2004 |
| JP | 2004-363959 A | 12/2004 |
| JP | 2005-073160 A | 3/2005 |
| JP | 2005-094638 A | 4/2005 |
| JP | 2005-136786 A | 5/2005 |

OTHER PUBLICATIONS

Chinese Office Action dated Apr. 29, 2010, issued in corresponding Chinese Patent Application No. 200710109519.3.

* cited by examiner

FIG. 4

```
REGISTER sip:192.168.0.1:5060 SIP/2.0
Via: SIP/2.0/TCP 192.168.0.1:5060;branch=z9hG5cd56sa7a
Max-Forwards:70
From: sip:accountB@sample.net;tag=49583
To: sip:accountB@sample.net
Call-ID: asd88asd77a@1.2.3.4
CSeq: 1 REGISTER
Contact: sip:accountB@sample.net:5060;expires=1800
Allow: INVITE,ACK,BYE,MESSAGE,NOTIFY
Content-Length: 0
```
— 12A

```
INVITE sip:accountB@sample.net SIP/2.0
Via: SIP/2.0/TCP terminal1@sample.net
Max-Forwards: 70
From: sip:accountA@sample.net;tag=43952
To: sip:accountB@sample.net
Call-ID: asd88asd77a@1.2.3.4
CSeq: 1 INVITE
Content-Type: application/sdp
Content-Length: 180 v=0
o=- 001 0000 IN IP4 200.1.1.1
s=COMMUNICATION CONNECTION
c=IN IP4 200.1.1.1
t=0 0
m=comm 6109 TCP
```
— 12B

```
SIP/2.0 200 OK
Via: SIP/2.0/TCP accountB@sample.net
From: sip:accountB@sample.net;tag=49583
To: sip:terminal1@sample.net
Call-ID: asd88asd77a@1.2.3.4
CSeq: 2 INVITE
Content-Type: application/sdp
Content-Length: 180 v=0
o=- 001 0000 IN IP4 200.2.2.2
s=COMMUNICATION CONNECTION
c=IN IP4 200.2.2.2
t=0 0
m=comm 7109 TCP
```
— 12C

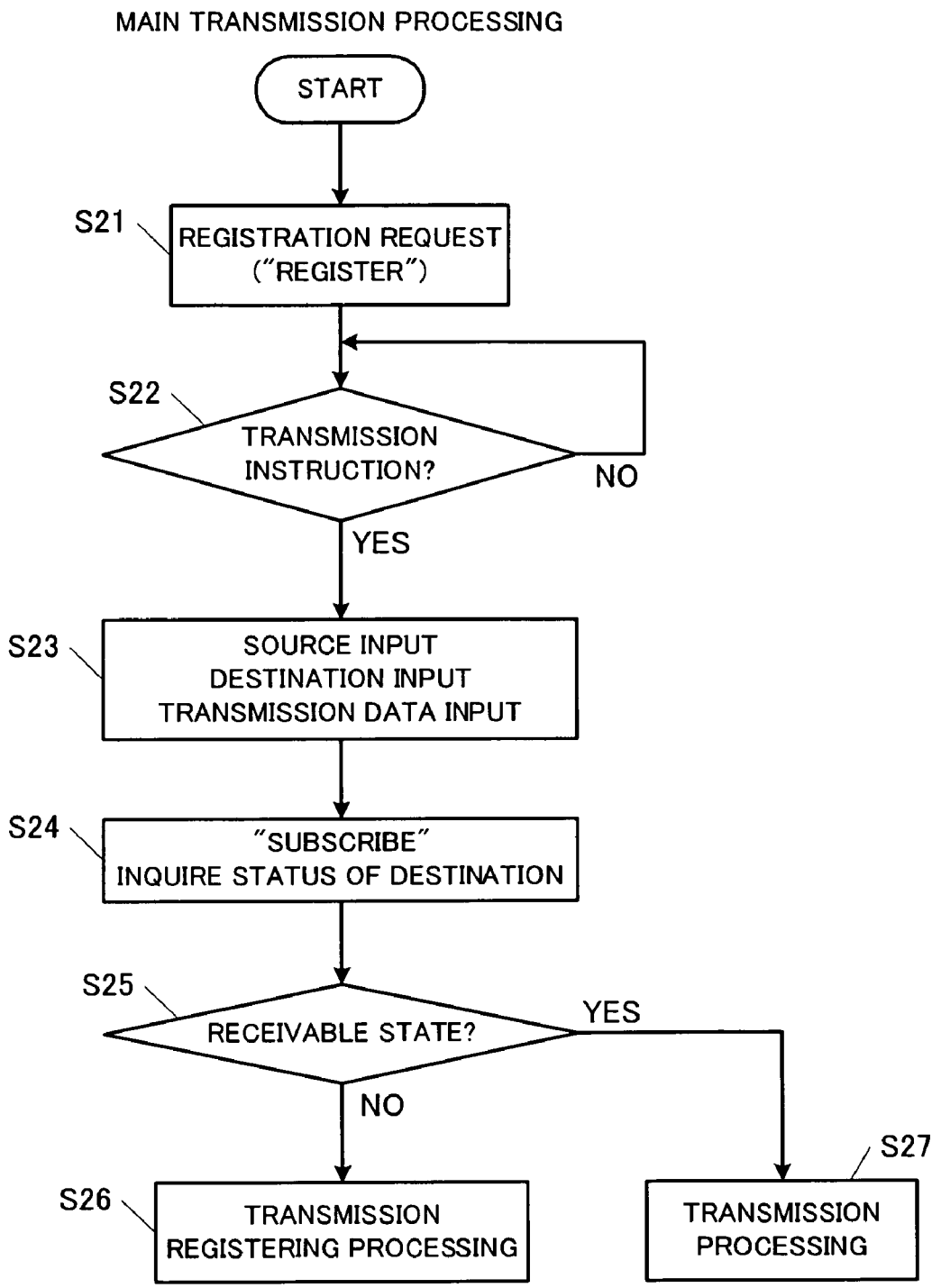

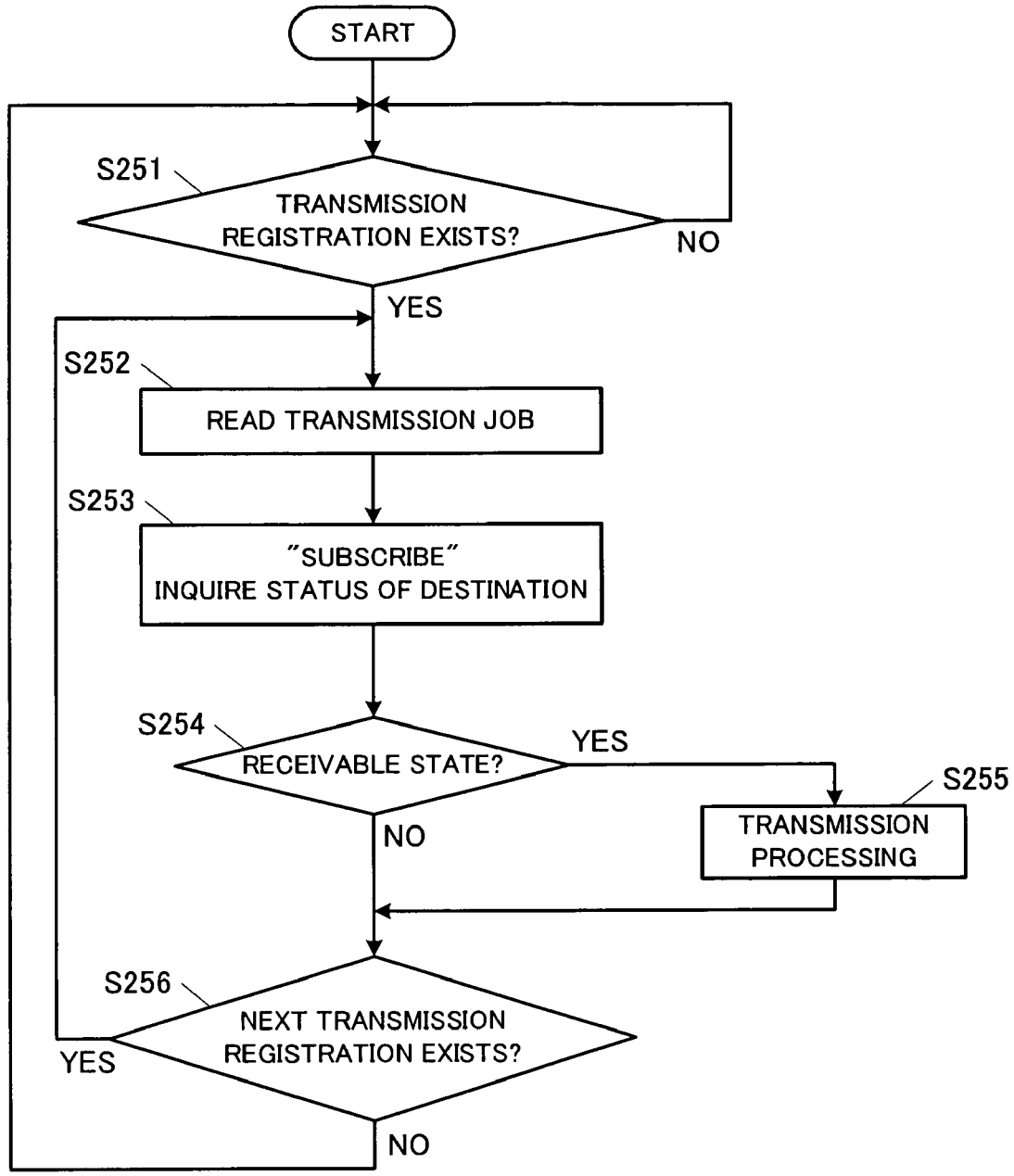

FIG. 10

USER DATABASE 4

| ACCOUNT | IP ADDRESS |
|---|---|
| terminal 1 | 192.168.0.2 |
| account B | 192.168.0.3 |
| ⋮ | ⋮ |

COMMUNICATION APPARATUS

BACKGROUND OF THE INVENTION

1. Field of the Invention

The present invention relates to a technique for managing transmission/reception of data by a communication apparatus using a server.

2. Description of Related Art

In using a facsimile machine, there is a case in which an object person (receiver) is absent when a user (sender) transmits a document. In this case, a received document that has been printed out from a facsimile machine on the receiver side is left unattended. And therefore in such a situation, a security issue must be addressed, because a third person may read the document surreptitiously.

The receiver may communicate with the sender via a telephone call or e-mail in order to assure reception of the received document. However, this involves a disadvantage of requiring time and effort. Thus, a facsimile machine is desired that allows the sender to transmit a document at desired time and location, and that allows the receiver to receive the document at desired time and location.

As one solution, there is a facsimile machine capable of forwarding a transmitted document so that the receiver can receive the document at a desired location. However, when the receiver cannot receive the transmitted document forwarded to the desired location immediately, the above noted security issue is not solved. In other words, there remains a certain amount of time during which the transmitted document printed out by the facsimile machine on the receiver side is left unattended.

Further, there is a facsimile machine with a secure receiving function capable of receiving the transmitted document at a time desired by the receiver. With the secure receiving function, a document that has been received during the absence of the receiver, such as at night or on a day-off, is stored in a memory without being printed out. With the sender setting a password, only a related person who knows the password can retrieve the document stored in the memory on the receiver side. However, since the document is stored in the memory in the facsimile machine on the receiver side until the receiver prints the document out, the security issue remains in a case in which the receiver is absent for an extended period of time.

A connection registration service disclosed in one conventional art document changes its function according to a status of an object person with whom a caller attempts to make a telephone conversation. In this service, a telephone conversation can be made as with a common telephone set when the object person whom the caller intends to talk is attended, and, when the object person is absent, a connection registration is made until the object person returns and a telephone conversation is established when the object person attends.

It is possible for a sender and a receiver to exchange information while communicating with each other using the service according to the above conventional art document. However, this connection registration service is designed for both the caller and receiver to use their respective telephone sets at the same time. Accordingly, application of this service to a facsimile machine or a data forwarding apparatus will make the sender and the receiver to use their facsimile machines or communication apparatuses at the same time. This leads to a constraint forcing the sender and the receiver to coordinate their schedules so that both the sender and the receiver attend at the same time.

SUMMARY OF THE INVENTION

In order to overcome the problems described above, preferred embodiments of the present invention aim to provide a communication apparatus capable of efficiently transmitting a document at times and locations desired by a sender and a receiver, respectively.

In order to solve the above problems, a communication apparatus according to the present invention includes: means for inputting transmission data; means for inquiring a server as to whether receiver identification information is registered on the server; means for transmitting the transmission data to a receiving apparatus when the receiver identification information is registered on the server, the receiving apparatus being a source of the receiver identification information; and storing means for storing the transmission data in memory means, when the receiver identification information is not registered on the server, until the receiver identification information is registered on the server.

Further, the communication apparatus according to the present invention further includes: means for inputting sender identification information; and means for transmitting the sender identification information to the receiving apparatus as a destination of the transmission data.

Further, the communication apparatus according to the present invention is configured such that the storing means includes means for transmitting the transmission data to the receiving apparatus as a source of the receiver identification information, when the receiver identification information is registered on the server.

Moreover, the communication apparatus according to the present invention further includes: registration means for inputting receiver identification information and registering the receiver identification information on a server; and means for receiving transmission data, in a state in which the receiver identification information is registered on the server, from a transmitting apparatus that has registered a transmission request of the transmission data specifying the receiver identification information on the server.

Further, the communication apparatus according to the present invention is configured such that the registration means includes: means for specifying a registration period of the receiver identification information; and means for requesting the server to delete the registration of the receiver identification information when the registration period has lapsed.

Further, the communication apparatus according to the present invention further includes: means for, accepting an instruction to cancel the registration of the receiver identification information and for requesting the server to delete the registration of the receiver identification information.

According to the communication apparatus of the present invention, it is possible to search via the server if an object person (receiver) who has been inputted by a person who transmits the document registers the receiver identification information on the server. With this configuration, it is possible to transmit the document in accordance with a registration status of the receiver.

Further, with the communication apparatus of the present invention, the transmission data can be stored in the communication apparatus used by the sender, and therefore, the document is kept secure until the receiver registers the receiver identification information on the server via the communication apparatus.

Moreover, the communication apparatus according to the present invention transmits the stored transmission data upon receipt of a notification of the registration of the receiver identification information from the server. With this configuration, it is possible to transmit the transmission data at a time when the receiver can receive the document.

Further, with the communication apparatus according to the present invention, the sender identification information is transmitted to the receiving apparatus, and the receiver can obtain information about the sender.

Further, because the communication apparatus according to the present invention is managed by the server, the user can transmit/receive the document using any communication apparatus that is managed by the server.

Moreover, with the communication apparatus according to the present invention, it is possible to set a time period during which the receiver identification information is registered on the server, and it is possible to request for the deletion of the account registered on the server even if the set period has not lapsed when the user desires to delete the registration of the receiver identification information. With this configuration, it is possible to receive the data at a time when the receiver can receive the document according to the convenience of the receiver.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4 illustrates examples of Session Initiation Protocol (SIP) commands used in the communication system according to the embodiment of the present invention;

FIG. 5 is a main flowchart illustrating transmission processing based on a transmitting device according to the embodiment of the present invention;

FIG. 6 is a flowchart illustrating transmission registering processing based on the transmitting device according to the embodiment of the present invention;

FIG. 10 is a table illustrating a user database according to the embodiment of the present invention.

DETAILED DESCRIPTION OF PREFERRED EMBODIMENTS

Figure 1:
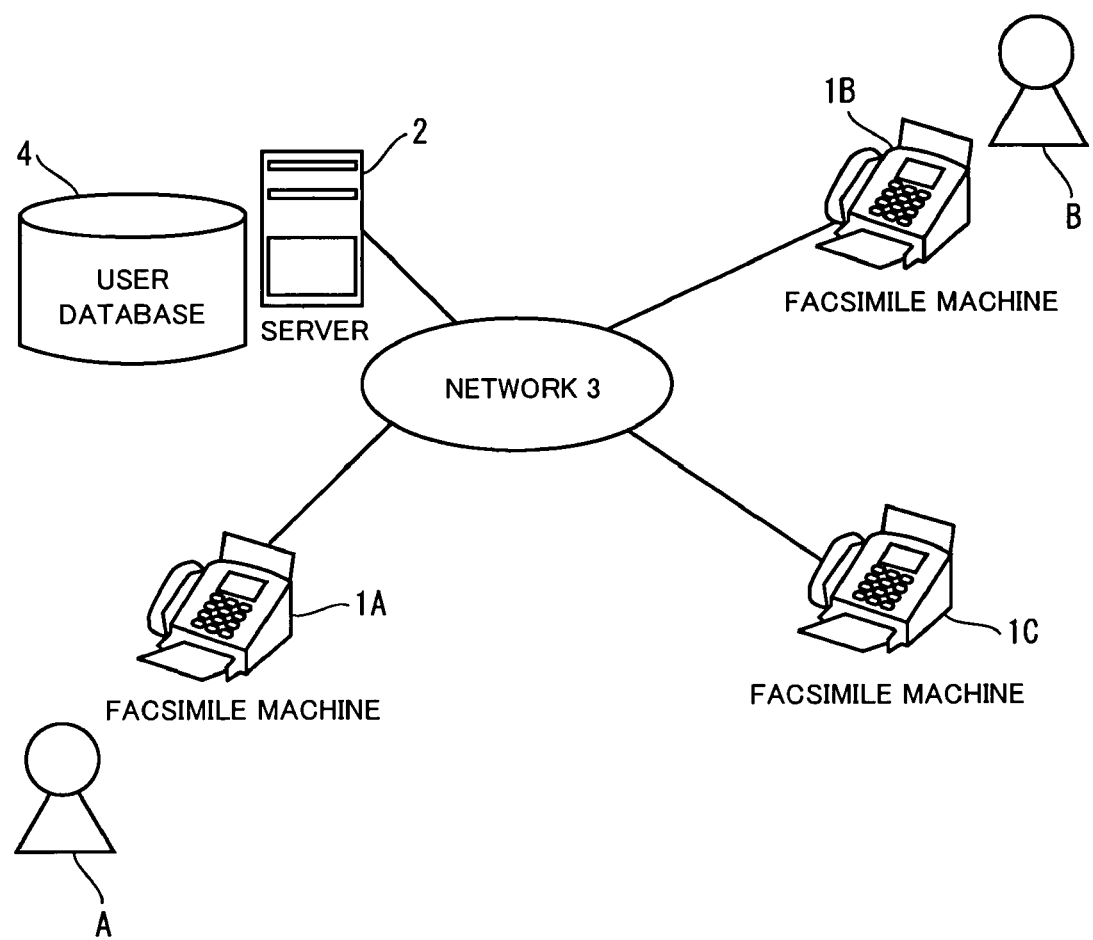
FIG. 1 is an overall view of a communication system using a facsimile machine according to one embodiment of the present invention.

In the following, an embodiment of the present invention will be described with reference to the drawings. FIG. 1 is an overall view of a communication system using a facsimile machine according to one embodiment of the present invention.

This communication system, as shown in FIG. 1, includes facsimile machines 1A, 1B, and 1C, a server 2, and a network 3 that connects the facsimile machines 1A, 1B, and 1C to the server 2. Although FIG. 1 illustrates only three facsimile machines 1A, 1B, and 1C, more than three facsimile machines may be provided. Further, the network 3 is a network including the Internet and a LAN. Note that, in the description that follows, the facsimile machines 1A, 1B, and 1C are also simply referred to as facsimile machine(s) 1 as appropriate when explaining a common feature.

The server 2 has a user database 4. The user database 4 is a database that manages the facsimile machine 1 and users who use the facsimile machine 1. FIG. 10 illustrates an example of registration in the user database 4. The table shows a state in which the facsimile machine 1A (terminal1) and an account of a user (accountB) are registered.

In FIG. 10, the terminal1 is an account for the facsimile machine 1A, and registered with an IP address (192.168.0.2) of the facsimile machine 1A. An IP address for the server 2 is 192.168.0.1. Further, the accountB is an account for a user B, and is registered with an IP address for a terminal2. In other words, the table shows a state in which the user B (accountB) is registered using the facsimile machine 1B (terminal2).

Figure 2:
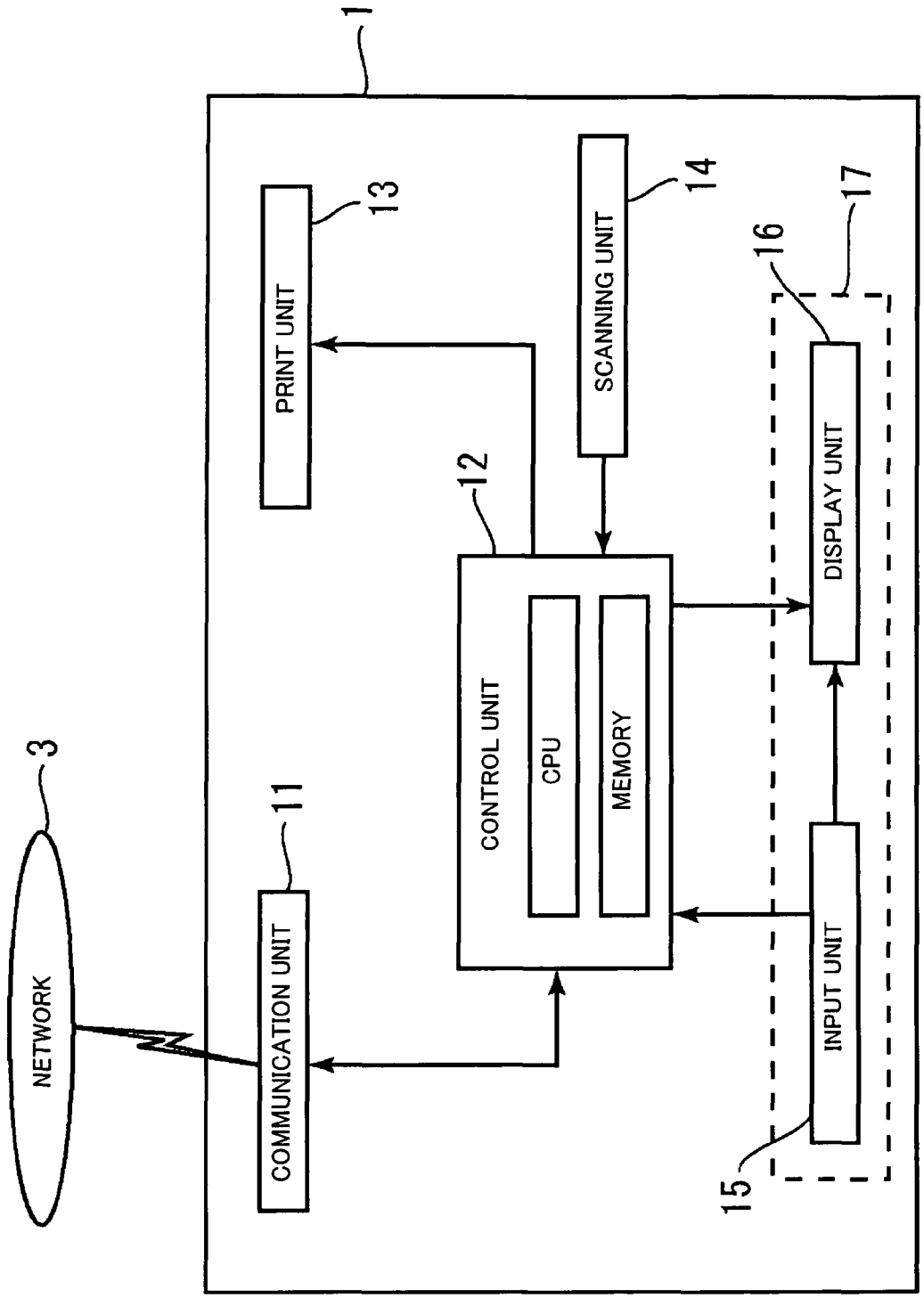
FIG. 2 is a functional block diagram of the facsimile machine according to the embodiment of the present invention.

Next, a configuration of the facsimile machine 1 is described. FIG. 2 is a functional block diagram of the facsimile machine 1 according to the present embodiment. The facsimile machine 1 includes a communication unit 11, a control unit 12, a print unit 13, a scanning unit 14, an input unit 15, and a display unit 16.

The communication unit 11 transmits/receives data through the network 3 to or from either the server 2 or the facsimile machine 1 of an object person with/by whom a document is to be transmitted/received. In other words, in this embodiment, each facsimile machine 1 transmits/receives data through the Internet and a LAN, and not through a telephone line. Consequently, the data to be transmitted/received is not limited to a facsimile document. In this embodiment, however, a description is given about an example in which a scanned document is transmitted to an object terminal.

A control unit 12 is a processing unit that controls an entirety of the facsimile machine 1, and includes e.g. a CPU and a memory. The control unit 12 demodulates document data out of data that the communication unit 11 has received, and has the print unit 13 print out the document. Further, the control unit 12 has a function to store the document data that has been scanned by the scanning unit 14 (scanner) in the memory.

In this embodiment, the input unit 15 and the display unit 16 are configured by a touch panel display 17. Through the touch panel display 17, the users A and B input data such as their respective accounts and passwords, as well as an account as a destination of document transmission.

A flow of communication processing of the facsimile machine 1 having the above functional units will now be described.

Figure 3:
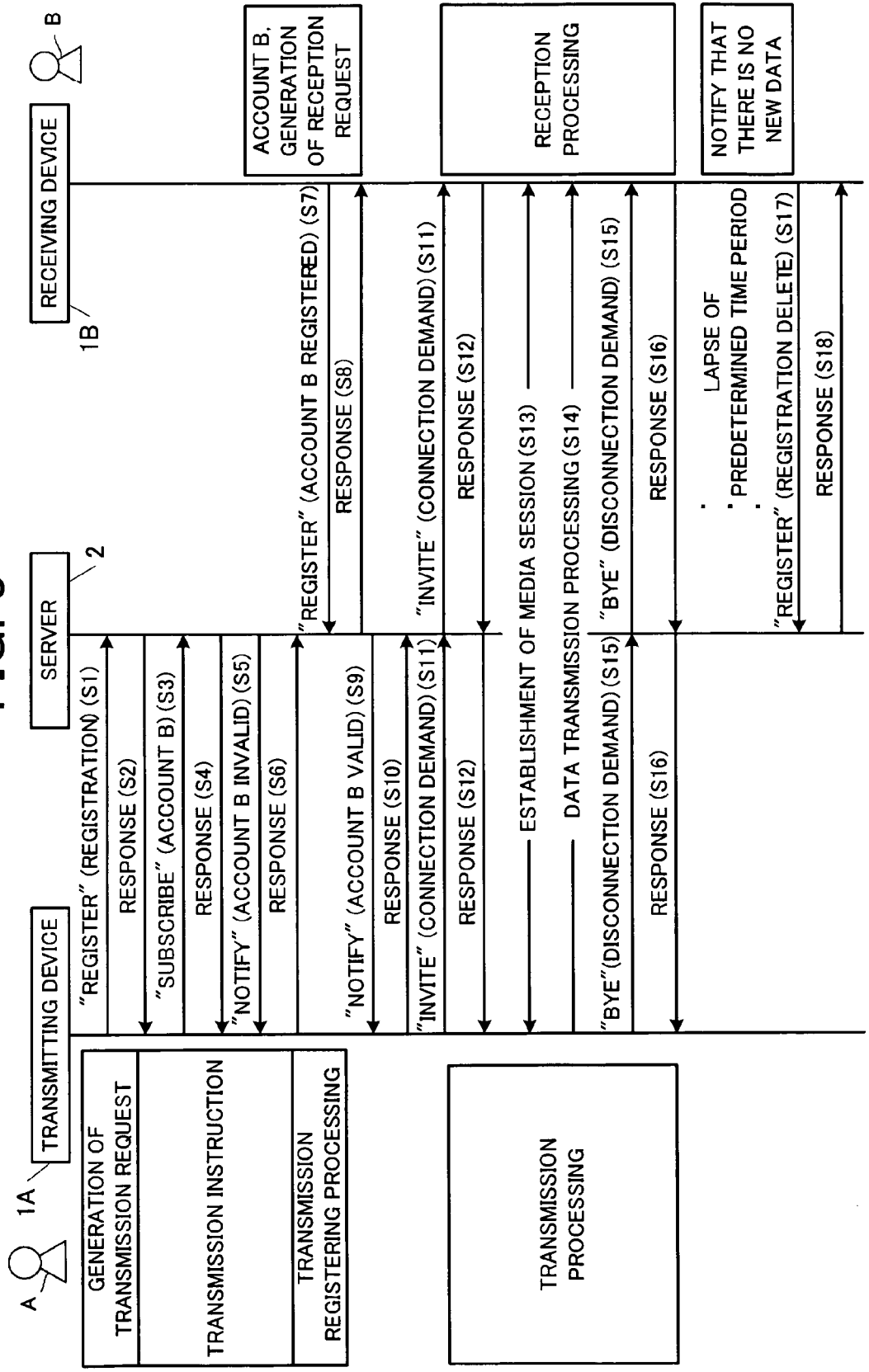
FIG. 3 illustrates an overall processing flow of the communication system according to the embodiment of the present invention.

FIG. 3 is a diagram illustrating a flow of processing by the communication system including a transmitting device 1A, a receiving device 1B and the server 2. In the description with reference to FIG. 3, the facsimile machine 1A is referred to as the transmitting device 1A as it serves as a device on a transmitting side, and the facsimile machine 1B is referred to as the receiving device 1B as it serves as a device on a receiving side.

It should be noted that the processing that the transmitting device 1A and the receiving device 1B execute is processing conducted by a program executed by the control unit 12 contained in each device. Further, Session Initiation Protocol (SIP) is utilized in order that the server 2 manages states of the transmitting device 1A and the receiving device 1B.

Prior to data transmission/reception between the transmitting devices 1A and 1B, an account registration request (REGISTER) of the transmitting device 1A is transmitted from the transmitting device 1A to the server 2 (Step S1). In response to the registration request, the server 2 registers the account of the transmitting device 1A on the database 4, and responds to the transmitting device 1A (Step S2). As shown in FIG. 10, the account of the transmitting device 1A is registered in association with the IP address (192.168.0.2).

Next, a user A has the transmitting device 1A scan a document. Then, the user A inputs an account of the user A and an account of the user B as a destination of data transmission. Then, the transmitting device 1A inquires the server 2 of the state of the account of the user B (SUBSCRIBE) (Step S3). The server 2 responds to the inquiry (Step S4). Then, the server 2 searches in the user database 4 to see the state of registration of the account of the user B. In the example of FIG. 3, upon the inquiry in Step S3 (SUBSCRIBE), the user B has not registered its account on the server 2. Accordingly, the server 2 notifies the transmitting device 1A that the account of the user B is not registered (NOTIFY) (Step S5). The transmitting device 1A responds to this notification (Step S6), and the transmitting device 1A queues a transmission registration to the server 2 until the account of the user B become registered, storing the scanned document data in the memory.

After this, when the user B registers its account on the receiving device 1B, the receiving device 1B transmits a registration request of the account of the user B to the server 2 (REGISTER) (Step S7). At this time, the user B can set a period of time during which the account remains registered on the receiving device 1B. If this time period is set, then an account registration period is stored in the memory. Then, the server 2, as shown in FIG. 10, registers the account of the user B (accountB) on the user database 4 in association with the IP address of the receiving device 1B (192.168.0.3), and responds to the receiving device 1B (Step S8). Subsequently, the server 2 notifies the transmitting device 1A that the user B has registered its account (NOTIFY)(Step S9). The transmitting device 1A responds to the notification (Step S10).

Then, the transmitting device 1A issues a connection demand via the server 2 to the receiving device 1B (INVITE) (Step S11). The receiving device 1B responds to this demand from the transmitting device 1A (Step S12). Once the transmitting device 1A receives the response, a media session is established between the transmitting device 1A and the receiving device 1B (Step S13). Then, the document data stored in the transmitting device 1A is transmitted to the receiving device 1B (Step S14).

Once the data transmission from the transmitting device 1A to the receiving device 1B is completed, the transmitting device 1A issues a disconnection demand to the receiving device 1B via the server 2 (BYE) (Step S15). The receiving device 1B responds to the demand from the transmitting device 1A (Step S16). As described above, the data transmission from the transmitting device 1A to the receiving device 1B is completed.

Thereafter, the receiving device 1B enters a standby status waiting for transmission of another connection demand from the server 2. Upon the lapse of the period of time during which the account remains registered set by the user B, the receiving device 1B issues a request for deletion of the account of the user B registered on the server 2 (REGISTER) (Step S17). At the same time, a message informing that there is no received data (no new data) is displayed on the display unit 16 of the receiving device 1B. Then, the server 2 deletes the account of the user B from the user database 4, and responds to the receiving device 1B (Step S18).

As described above, the SIP is used in the information exchange among the transmitting device 1A, the receiving device 1B, and the server 2. In FIG. 4, examples of SIP commands used in the communication system in FIG. 3 are illustrated. A reference numeral 12A in FIG. 4 represents a command for registration of the account of the user B (REGISTER) (Step S7 in FIG. 3). An account of a person who has issued the registration request (user B) is written in a From field (accountB@sample.net), and an account of a person to be registered (user B) is written in a To field (accountB@sample.net). Further, a time period set by the user B during which the account remains registered (1800 seconds in this example) is written by the second in an expires field.

A reference numeral 12B represents a command of a connection demand from the transmitting device 1A to the receiving device 1B (Step S11 in FIG. 3). The account of the user B (accountB@sample.net) as a destination is written in the first line, and an URI (terminal1@sample.net) of the own device is written in the second line. The account of the user A (accountA@sample.net) as an issuer of the request is written in the From field, and the account of the user B (accountB@sample.net) as a destination of the request is written in the To field. As described above, because the account of the user A as source identification information is written in the From field, it is possible, on the reception side, to identify a source user of the transmission data by referring to the From field.

A reference numeral 12C represents a command for a response to the connection demand from the receiving device 1B (Step S12 in FIG. 3) (200 OK).

In FIG. 3, the case is explained in which the user B registers the account to the receiving device 1B after the user A registers the account on the transmitting device 1A, and then transmission processing for the data is performed. However, various cases can be possible other than the above case. Examples include a case in which the user B does not register the account on the receiving device 1B after the user A registers the account on the transmitting device 1A. Details of the processing corresponding to the various cases are described with reference to flowcharts illustrated in FIG. 5 to FIG. 9.

Figure 7:
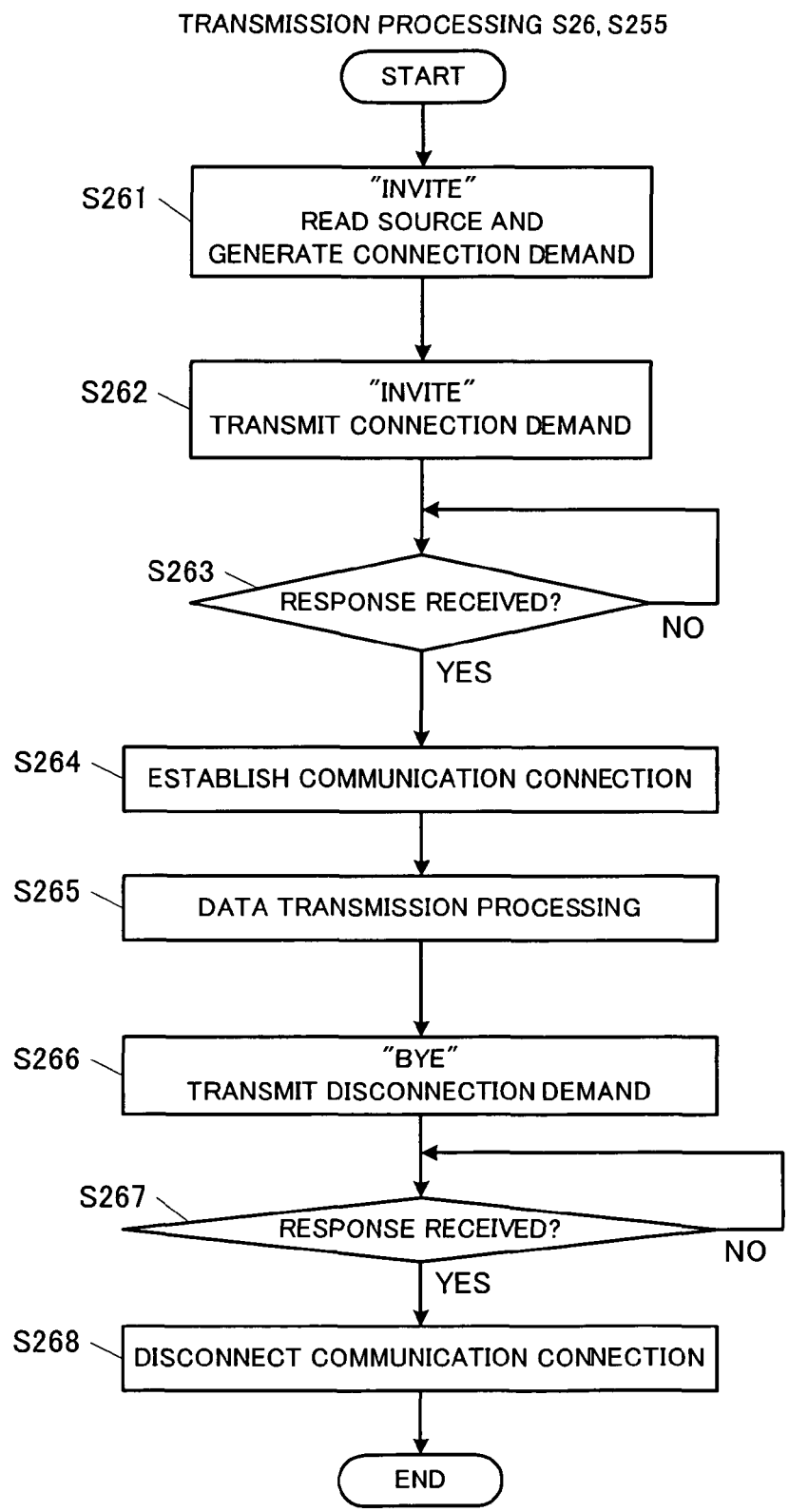
FIG. 7 is a flowchart illustrating transmission processing based on the transmitting device according to the embodiment of the present invention.

FIG. 5, FIG. 6, and FIG. 7 are the flowcharts illustrating the transmission processing based on the transmitting device 1A. A main flow of the transmission processing is described with reference to the flowchart in FIG. 5. The transmitting device 1A transmits the request for registration of the account of the transmitting device 1A (REGISTER) to the server 2 in advance before a user starts document transmission processing (Step S21). In the registered state, the touch panel display 17 of the transmitting device 1A is operated by the user, and changed to a display needed in document transmission (Step S22). Once the touch panel display 17 of the transmitting device 1A is changed to the display needed in document transmission, the user A has the scanning unit 14 scan a document to be transmitted.

Subsequently, the user A inputs the account and the password of the user A, and further inputs the account of the user B as the destination (Step S23). As described above, in addition to the account of the destination, the account of the user A as a source is also inputted. The account of the source is recorded in the header as described above, and transmitted to a terminal at the destination. Accordingly, the terminal at the destination can identify the user A as the source based on this information. For example, it is convenient to display information such as a name of the user A as the source on an operation panel. Further, since the account of the source is notified, the user A can use any devices to perform the transmission operation. In a case in which the transmission is performed with one of the devices, it is notified that the source is the user A, and therefore it is possible to transmit the document from a desired location. Further, the user A can receive a document whose destination is the user A at a desired location.

Next, a command inquiring of the source (SUBSCRIBE) is transmitted to the server 2 based on the account information of the destination that has been inputted (Step S24). The server 2 searches in the user database 4 to find the registration status of the user B.

When the user B has registered its account on any of the facsimile machines 1 (e.g. receiving device 1B), the transmitting device 1A is notified from the server 2 that the user B is registered with the account. Upon this notification, it is determined that the user B is in a receivable state (YES in Step S25), and the transmitting device 1A performs the transmission processing (Step S27). This processing corresponds to the steps from Step S9 performed by the transmitting device 1A in FIG. 3. This transmission processing will be described later with reference to the flowchart in FIG. 7.

When the user B has not registered its account on any of the facsimile machines 1, the server 2 notifies that the user B is not registered with the account. Upon this notification, it is determined that the user B is not in a receivable state (NO in Step S25). Accordingly, the transmitting device 1A performs transmission registering processing, and stores the scanned document data in the memory until the account of the user B is registered (Step S26).

Next, the above transmission registering processing is described with reference to the flowchart in FIG. 6. The transmitting device 1A is used by a plurality of users having individual accounts in addition to the user A. In the following flow, a description is given taking an example in which the transmission registering processing is performed by the user A. However, the transmission registering processing can actually be performed by the plurality of users.

First of all, the transmitting device 1A checks if there is a transmission registration (Step S251). When there is a transmission registration, the transmitting device 1A reads out a transmission job (Step S252). In the transmission job, information specifying data for a transmitted document, source identification information (in this example, the account of the user A), and destination identification information (in this example, the account of the user B) are registered.

Next, the transmitting device 1A inquires the server 2 of the registration status of the account of the user B (Step S253).

When the user B has registered its account to any of the facsimile machines 1 (YES in Step S254), the transmitting device 1A performs the transmission processing for the document data using the facsimile machine 1 as destination (Step S255). The transmission processing will be described later with reference to the flowchart in FIG. 7.

When the user B has not registered its account to any of the facsimile machines 1 (NO in Step S254), the transmitting device 1A checks if there is another transmission registration (Step S256), and repeats the above described transmission registering processing.

Next, the transmission processing is described with reference to the flowchart in FIG. 7. This processing corresponds to the steps from Step S11 performed by the transmitting device 1A in FIG. 3. First of all, the transmitting device 1A reads out the source identification information (account), and generates data for a connection demand (Step S261). Next, via the server 2, the transmitting device 1A transmits the connection demand to the receiving device 1B (Step S262). This corresponds to Step S11 in FIG. 3, as well as to the SIP command of 12B in FIG. 4.

Next, when a response to the connection demand comes from the receiving device 1B (YES in Step S263), the transmitting device 1A receives the response, and a communication connection between the transmitting device 1A and the receiving device 1B is established (Step S264).

After the communication connection is established between the transmitting device 1A and the receiving device 1B, a media session is established, and the transmitting device 1A transmits the document data to the receiving device 1B (Step S265). Upon completion of the data transmission from the transmitting device 1A to the receiving device 1B, the transmitting device 1A transmits a disconnection demand to the receiving device 1B via the server 2 (Step S266).

When the transmitting device 1A receives a response to the disconnection demand (YES in Step S267), the communication connection between the transmitting device 1A and the receiving device 1B is disconnected (Step S268).

Figure 8:
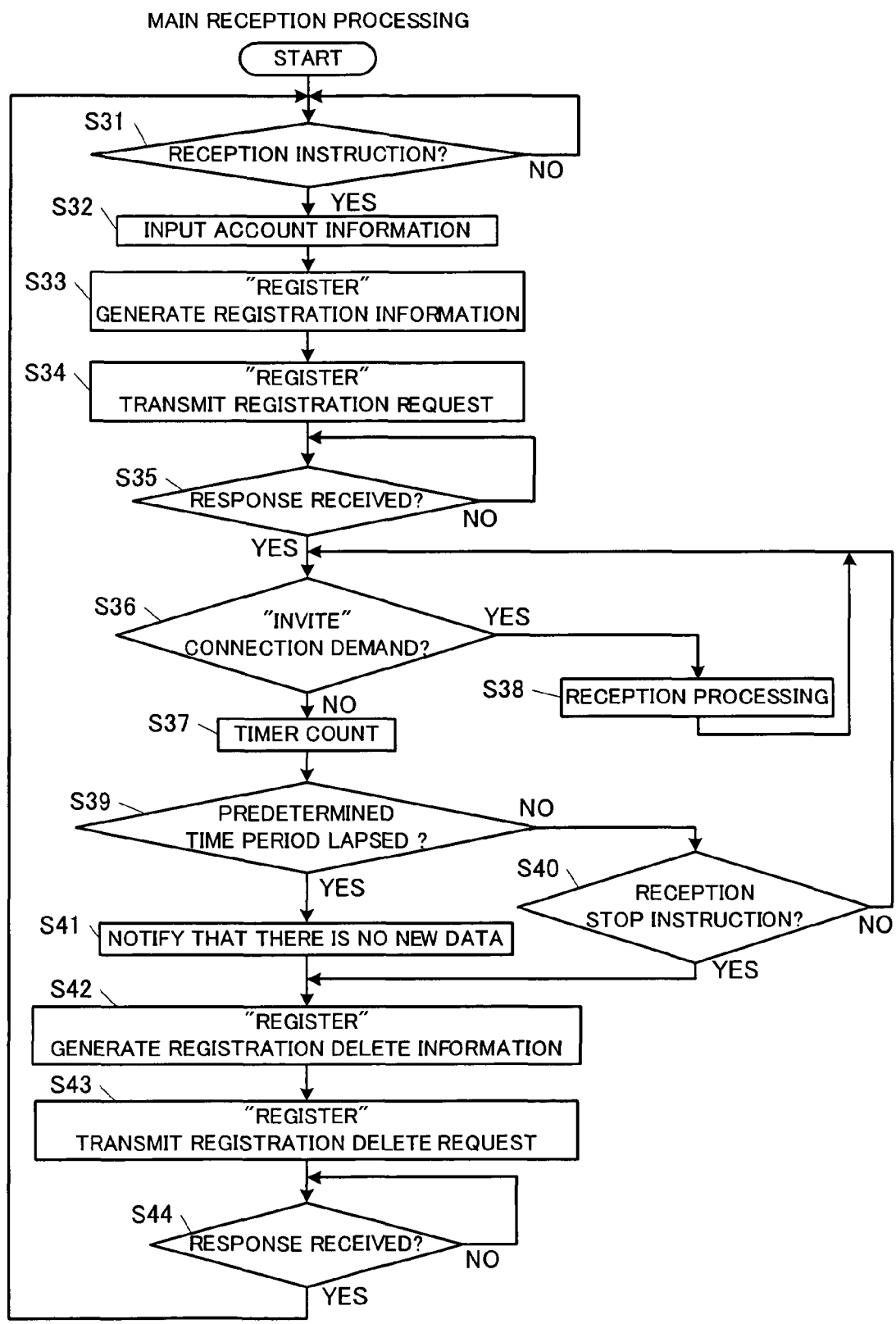
FIG. 8 is a main flowchart illustrating reception processing based on a receiving device according to the embodiment of the present invention.
Figure 9:
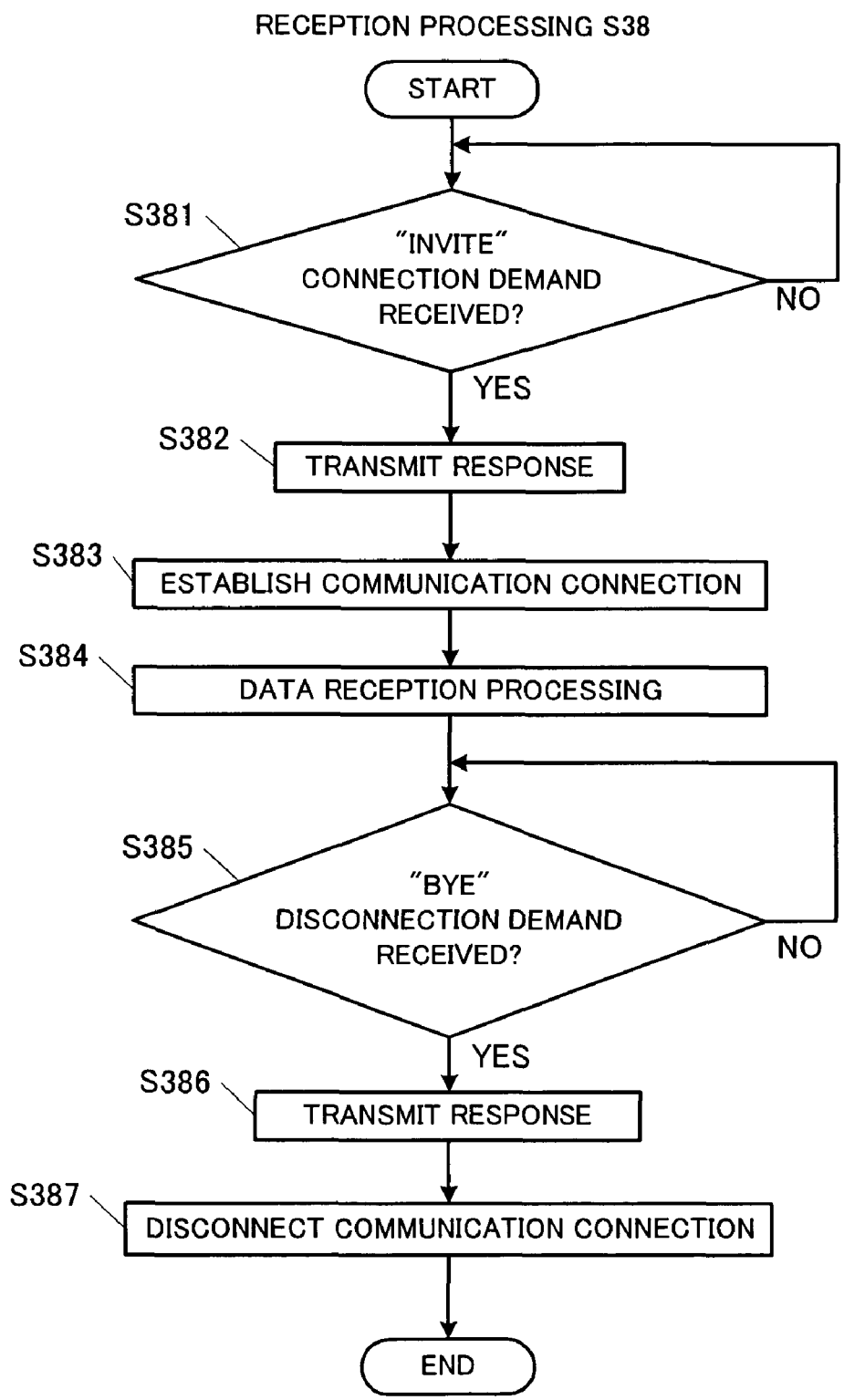
FIG. 9 is a flowchart illustrating the reception processing based on the receiving device according to the embodiment of the present invention.

Next, the reception processing based on the receiving device 1B is described with reference to the flowcharts FIGS. 8 and 9. First of all, a main flow of the reception processing is described with reference to the flowchart in FIG. 8.

When the user B operates the touch panel display 17 of the receiving device 1B to receive the document, the touch panel display 17 of the receiving device 1B is changed to a display needed in document reception (YES in Step S31). Then, the user B inputs the account and the password through the touch panel display 17 of the receiving device 1B to register the account on the receiving device 1B (Step S32). At this time, the user B can set a period of time during which the account remains registered on the receiving device 1B. When the receiving device 1B generates registration information on the account of the user B (Step S33), the receiving device 1B transmits a request for registration of the account information to the server 2 (Step S34). This corresponds to Step S7 in FIG. 3, as well as to the SIP command of 12A in FIG. 4.

When the account of the user B is registered on the server 2 and the response thereof is transmitted to the receiving device 1B (YES in Step S35), the receiving device 1B enters the standby status waiting for transmission of a connection demand.

Further, when the receiving device 1B receives the connection demand from the transmitting device 1A via the server 2 (YES in Step S36), the receiving device 1B performs the reception processing (Step S38). Here, in the connection demand transmitted from the transmitting device 1A, the account of the user A is registered as the source identification information, as described above. For example, the receiving device 1B can display the source information on the display unit 16. The reception processing of the receiving device 1B will be described later.

When the connection demand from the transmitting device 1A is not transmitted (NO in Step S36), a timer provided to the control unit 12 starts up and counts a time period from a point in time at which the user B has registered the account (Step S37). Upon the lapse of the period of time during which the account remains registered set by the user B (YES in Step S39), a message informing that there is no received data (no new data) is displayed on the display unit 16 of the receiving device 1B (Step S41). Next, the receiving device 1B generates information for deleting the registration of the account of the user B (Step S42), and transmits a registration deletion request to the server 2 (Step S43).

Further, when, before the lapse of the period of time during which the account remains registered set by the user B (NO in Step S39), the user B gives an instruction to stop the reception to the receiving device 1B (YES in Step S40), the processing of Steps S42 and S43 as described above is also performed. For example, when the user B has set such that the registration state shall be maintained for 30 minutes but thereafter something comes up and the user B has to go out, the user B instructs the receiving device 1B to delete the registration. By this instruction, the registration of the user B is deleted from the server 2, and the state shifts to an unreceivable state.

When the server 2 executes the deletion of the account of the user B, the response thereof is transmitted from the server 2 to the receiving device 1B (YES in Step S44).

Next, the reception processing by the receiving device 1B (Step S38) is described with reference to the flowchart in FIG. 9. When the receiving device 1B receives the connection demand from the transmitting device 1A via the server 2 (YES in Step S381), the receiving device 1B transmits the response to this demand to the transmitting device 1A via the server 2 (Step S382). This corresponds to Steps S11 and S12 in FIG. 3. Further, this also corresponds to the SIP command of 12C (200 OK) in FIG. 4.

When the transmitting device 1A receives the response, the communication connection is established between the transmitting device 1A and the receiving device 1B (Step S383).

Then, the media session is established, and the receiving device 1B receives the document data stored in the transmitting device 1A (Step S384).

Upon completion of the data transmission from the transmitting device 1A to the receiving device 1B, the receiving device 1B receives the disconnection demand from the transmitting device 1A (YES in Step S385). After the reception of the disconnection demand, the receiving device 1B transmits the response to the disconnection demand to the transmitting device 1A (Step S386). Then, the communication connection between the transmitting device 1A and the receiving device 1B is disconnected (Step S387). The reception processing by the receiving device 1B is performed in the above manner.

As described above, by using the facsimile machine 1 according to the present embodiment, when a user is a sender of a document, it is possible to transmit the document efficiently at a desired time and a desired location. In the above example, the sender (user A) specifically uses the transmitting device 1A. However, the user A can use any of the facsimile machines 1 that are managed by the server. The document is safely managed because the document to be transmitted is stored in the facsimile machine 1 used by the sender. Further, when the user of the facsimile machine 1 is a receiver (user B), it is also possible to receive the document efficiently at a desired time and a desired location, for the same reason as described above.

Moreover, as described above, the present invention can be applied to various data communication terminals in addition to facsimile machines. In other words, the present invention can be applied not only to a mode in which a document is scanned by a scanner and transmitted to a destination terminal, but also to a wide variety of terminals that transmit data stored in a memory to the destination terminal.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A communication apparatus comprising:
   registration means for inputting receiver identification information and registering the receiver identification information on a server;
   means for receiving transmission data specifying the receiver identification information, when the receiver identification information is registered on the server, from a transmitting apparatus registered on the server,
   wherein the registration means includes:
   means for specifying a registration period of the receiver identification information; and
   means for requesting the server to delete the registration of the receiver identification information when the registration period has lapsed.

2. The communication apparatus according to claim 1, further comprising:
   means for accepting an instruction to cancel the registration of the receiver identification information and for requesting the server to delete the registration of the receiver identification information.

3. A communication apparatus comprising:
   a registration unit for inputting receiver identification information and registering the receiver identification information on a server; and
   a receiving unit for receiving transmission data specifying the receiver identification information, when the receiver identification information is registered on the server, from a transmitting apparatus registered on the server,
   wherein the registration unit includes:
   a specifying unit for specifying a registration period of the receiver identification information; and
   a requesting unit for requesting the server to delete the registration of the receiver identification information when the registration period has lapsed.

4. The communication apparatus according to claim 3, further comprising:
   a requesting unit for accepting an instruction to cancel the registration of the receiver identification information and for requesting the server to delete the registration of the receiver identification information.

5. A method for communication of a communication apparatus, the method comprising:
   a step for inputting receiver identification information and registering the receiver identification information on a server;
   a step for receiving transmission data specifying the receiver identification information, when the receiver identification information is registered on the server, from a transmitting apparatus registered on the server;
   a step for specifying a registration period of the receiver identification information; and
   a step for requesting the server for deletion of the registration of the receiver identification information when the registration period has lapsed.

6. The method of controlling a communication apparatus according to claim 5, further comprising:
   a step for accepting an instruction to cancel the registration of the receiver identification information and for requesting the server to delete the registration of the receiver identification information.

* * * * *